United States Patent Office 3,510,731
Patented May 5, 1970

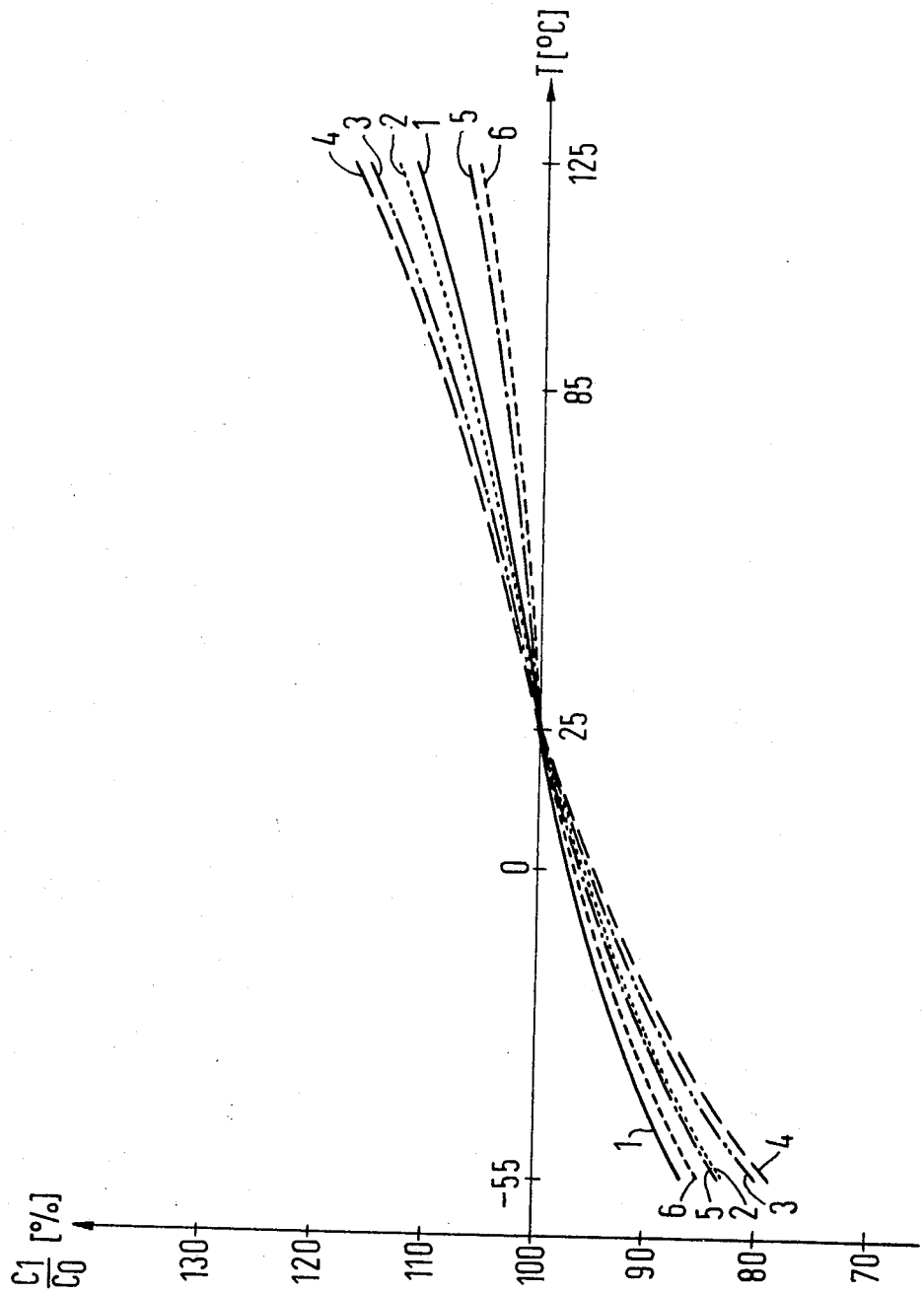

3,510,731
ELECTROLYTIC CAPACITOR WITH ELECTROLYTE HAVING A SOLVENT CONTAINING DIMETHYL FORMAMIDE AND γ-BUTYROLACTONE
Sigrid Thiem and Dieter Thiem, Cleveland, Ohio, assignors to Siemens Aktiengesellschaft, a corporation of Germany
Filed Apr. 12, 1968, Ser. No. 720,842
Claims priority, application Germany, Apr. 12, 1967,
S 109,297
Int. Cl. H01g 9/00
U.S. Cl. 317—230                                     15 Claims

ABSTRACT OF THE DISCLOSURE

An electrolytic capacitor and electrolyte effective over a temperature range of −55° C. to +125° C. comprising an anode body of aluminum foil having a dielectrically effective oxide layer thereon and being contacted by an electrolyte consisting essentially of a solvent mixture of γ-butyrolactone, and dimethyl formamide having ionogenic substances, such as a mixture of water, tri-n-butylamine and boric acid dissolved therein and having a cathode current supply connected to said electrolyte. The preferred electrolyte consists of a solvent mixture of 5 to 40% by weight of dimethyl formamide and 95 to 60% by weight of γ-butyrolactone and having, per kilogram of solvent mixture, ionogenic substances consisting of up to 2 moles of water, 0.10 to 0.25 mole of tri-n-butylamine and 0.3 to 1.2 moles of boric acid.

---

This invention relates to an electrolytic capacitor and electrolyte thereof and more particularly to an electrolytic capacitor having an effective operating temperature range from −55° C. to +125° C., utilizing an improved electrolyte.

Electrolytic capacitors having an anode body of aluminum foil with a dielectrically effective oxide layer thereon, in contact with an electrolyte and having a cathode current supply connected to the electrolyte are known. Further, electrolytes having a mixture of di-substituted amides and organic acids, such as formic acid, acetic acid, propionic acid, butyric acid, etc. are utilized in such heretofore available electrolytic capacitors. Dimethyl formamide is generally considered to be within the broad classification of di-substituted amides useable with the known electrolytic capacitors. Further, the heretofore available electrolyte mixtures of di-substituted amides and organic acids including other additives, such as for example, butyrolactone.

However, the heretofore available electrolytic capacitors and electrolytes have had a number of serious drawbacks including limited effectiveness over a relatively broad range of temperatures, ineffectiveness at relatively high or low temperatures, insufficient sparking potential, corrosiveness of the electrolytic capacitor materials, etc.

Accordingly, it is an object of the present invention to provide an improved electrolytic capacitor and electrolyte having a relatively broad operating temperature range and a relatively high sparking potential.

It is a further object of the invention to provide an improved electrolytic capacitor and electrolyte having improved conductivity at relatively low and at relatively high temperatures.

It is yet a further object of the invention to provide an improved electrolyte having a relatively high sparking potential for use in electrolytic capacitors rated at voltages up to about 350 volts.

It is still a further object of the invention to provide an improved electrolyte having a high compatibility with anode materials of an electrolytic capacitor.

Other objects, adavantages and features of the invention will become more apparent with the teachings of the principles of the present invention in connection with the disclosure of the preferred embodiments thereof in the specification, claims and drawings.

The present invention provides an electrolytic capacitor with an operating electrolyte having good conductivity at low temperatures, a high boiling point and low vapor pressure at elevated temperatures, a low congealing point, a high compatibility with anode materials of an electrolytic capacitor, relative inertness (i.e., non-corrosiveness) toward the dielectric material or any other material in the electrolytic capacitor and having a sparking potential of at least 400 volts.

The electrolytic capacitor comprises an anode body of aluminum, such as aluminum foil, a dielectrically effective aluminum oxide layer thereon, and a counter-electrode formed by an improved electrolyte where a cathode current supply means is functionally connected to the electrolyte. The improved electrolyte consists of a solvent mixture of γ-butyrolactone and dimethyl formamide with ionogenic substances dissolved therein.

A preferred solvent mixture for use with the electrolyte of the present invention consists of about 5 to 40% by weight of dimethyl formamide (or similarly suitable di-substituted amides) and about 95 to 60% by weight of γ-butyrolactone. The preferred electrolyte material or ionogen for use with the preferred solvent mixture is, based upon one kilogram of the solvent mixture, about 0.1 to 2 moles of water, about 0.10 to 0.25 mole tri-n-butylamine and about 0.3 to 1.2 moles of boric acid. The preferred ratio of boric acid to tri-n-butylamine in the electrolyte is in the range of 3:1 to 4.5:1.

A particularly preferred electrolyte of the present invention consists of a solvent mixture containing about 90% by weight of γ-butyrolactone and about 10% by weight of dimethyl formamide and an ionogen mixture of about 1.03 moles of boric acid, about 0.23 mole of tri-n-butylamine and about 0.62 mole of water per kilogram of the aforesaid solvent.

In order to further improve the characteristics of the electrolyte of the present invention and to avoid dehydration of the dielectrically effective aluminum oxide layer on the anode body at elevated temperatures, 0.005 to 0.01 mole of phosphorus per kilogram of solvent is added, preferably in the form of phosphoric acid or any other suitable phosphate ion forming substance.

A suitable solvent for use in the electrolyte of the present invention must include solvent materials having a relatively high boiling point and having as low a congealing point as possible. An example of such a solvent material is γ-butyrolactone which has a boiling point of 206° C. and a congealing point of −42° C. and appears to best meet these requirements. To further lower the congealing point of a solvent material, such as γ-butyrolactone, a pre-selected portion of dimethyl formamide is added. Table I below shows the congealing point of various mixtures (in percent by weight) of γ-butyrolactone and dimethyl formamide.

TABLE I

| γ-Butyrolactone | Dimethyl formamide | Congealing point in °C. |
|---|---|---|
| 100 | 0 | −42 |
| 95 | 5 | 1 −64 |
| 90 | 10 | −53 |
| 80 | 20 | −69 |
| 60 | 40 | Below −74 |
| 40 | 60 | Below −74 |

1 Value ascertained by several different measurements.

A suitable electrolyte or ionogen mixture for use in the electrolyte of the present invention must exhibit, among other characteristics, a high degree of dielectric film forming properties, good conductivity at relatively low temperatures and a relatively high sparking potential. An example of an electrolyte or ionogen added to a suitable solvent mixture in accordance with Table I is a mixture of boric acid, tri-n-butylamine and water. To further illustrate the excellent properties of this electrolyte mixture, the following example is set forth.

EXAMPLE I

A 50 ml. beaker was provided with an aluminum cathode for utilization in measuring the sparking potential. An aluminum strip having a total surface of 4.5 cm.$^2$, after being etched in a 4% NaOH solution, was utilized as the anode. The formation current density was 10 ma./cm.$^2$. The voltage at which visible spark play began was designated as the sparking potential. A series of measurements was taken to ascertain the conductivity and sparking potential behavior as a function of the concentration of the various components of the electrolyte. For this purpose, the concentration of only one of the materials was varied in each case.

The first series consisted of variations of the composition of the solvent. The following concentrations of the other components within the system were utilized throughout this series; 0.23 mole of tri-n-butylamine per kilogram of solvent; 1.03 moles of boric acid per kilogram of solvent; and 0.62 mole of water per kilogram of solvent.

SERIES A

| Solvent composition in percent by weight | | Specific conductivity in ms./cm. | | Sparking potential in volts |
|---|---|---|---|---|
| Dimethyl formamide | γ-Butyrolactone | At 30° C. | At −60° C. | |
| 10 | 90 | 1.30 | 0.032 | 440 |
| 20 | 80 | 1.34 | 0.036 | 430 |
| 40 | 60 | 1.29 | 0.048 | 440 |
| 60 | 40 | 1.25 | 0.058 | 260 |
| 80 | 20 | 1.20 | 0.071 | 165 |
| 90 | 10 | 1.20 | 0.090 | 130 |

As will be noticed, an increase of dimethyl formamide yields an increase of contuctivity at −60° C., however, after a 40% by weight dimethyl formamide solution is achieved, the sparking potential declines rapidly.

The second series consists of variations in the ratio of tri-n-butylamine to boric acid. The following concentrations of other materials used in the electrolyte system were utilized throughout this series: 0.23 mole of tri-n-butylamine per kilogram of solvent; 0.61 mole of water per kilogram of solvent; and a solvent containing 90% by weight of γ-butyrolactone and 10% by weight of dimethyl formamide.

SERIES B

| Moles of boric acid per kg. of solvent | Moles of boric acid per mole of tri-n-butylamine | Specific conductivity in ms./cm. | | Sparking potential in volts |
|---|---|---|---|---|
| | | At 30° C. | At −60° C. | |
| 0.35 | 1.5 | 0.65 | 0.035 | 390 |
| 0.69 | 3.0 | 1.00 | 0.030 | 380 |
| 0.80 | 3.5 | 1.10 | 0.031 | 430 |
| 1.03 | 4.5 | 1.30 | 0.032 | 440 |
| 1.50 | 6.5 | 1.34 | 0.031 | 390 |

As indicated above, an increase of the boric acid content increases the conductivity and spark potential, however, at 6.5 moles of boric acid per mole of tri-n-butylamine, the solubility limit of boric acid at 25° C. is exceeded.

A third series consists of variations in the water content in the electrolyte system. The following concentrations of the other materials in such a system were utilized throughout this series: 0.23 mole of tri-n-butylamine per kilogram of solvent; 1.3 moles of boric acid per kilogram of solvent; and a solvent containing 90% by weight of γ-butyrolactone and 10% by weight of dimethyl formamide.

SERIES C

| Moles of water added per kg. of solvent | Specific conductivity in ms./cm. | | Sparking potential in volts |
|---|---|---|---|
| | At 30° C. | At −60° C. | |
| 0 | 1.15 | 0.030 | 440 |
| 0.62 | 1.30 | 0.032 | 440 |
| 1.0 | 1.29 | 0.031 | 430 |
| 1.5 | 1.30 | 0.030 | 440 |
| 2.0 | 1.34 | 0.029 | 410 |
| 5.0 | 1.43 | 0.025 | 340 |
| 10.0 | 1.72 | 0.007 | 370 |

The addition of water between 0 to 1.5 moles per kilogram of solvent does not appear to exert any decisive influence on the conductivity of spark potential. Above 1.5 moles of water, the spark potential and the conductivity decrease slightly at −60° C. At 10 moles of water, the mixture freezes solid at −60° C.

The fourth series consists of variations in the tri-n-butylamine and boric acid content. The following concentrations were maintained throughout this series: 1:4 ratio between tri-n-butylamine and boric acid; 0.62 mole of water per kilogram of solvent; and a solvent containing 90% by weight of γ-butyrolactone and 10% by weight of dimethyl formamide.

SERIES D

| Moles of tri-n-butylamine per kg. of solvent | Moles of boric acid per kg. of solvent | Specific conductivity in ms./cm. | | Sparking potential in volts |
|---|---|---|---|---|
| | | At 30° C. | At −60° C. | |
| 0.10 | 0.40 | 0.73 | 0.031 | 380 |
| 0.15 | 0.60 | 0.86 | 0.029 | 400 |
| 0.20 | 0.80 | 1.10 | 0.031 | 430 |
| 0.30 | 1.20 | 1.24 | 0.029 | 340 |
| 0.40 | 1.60 | 1.20 | 0.023 | 330 |

At a 0.40 mole concentration of tri-n-butylamine per kilogram of solvent, a non-homogeneous mixture was observed at 25° C.

The foregoing series show that the preferred composition of the electrotyte is preferably within the following limits: the solvent mixture contains 5 to 40% by weight of dimethyl formamide and 95 to 60% of γ-butyroltactone; the electrolyte or ionogen mixture contains 0.10 to 0.25 mole of tri-n-butylamine per kilogram of solvent; 0.3 to 1.125 moles of boric acid per kilogram of solvent and up to 2 moles of water per kilogram of solvent. The series also indicated that the preferred mole ratio of boric acid to tri-n-butylamine is in the range of 3.0:1 to 4.5:1.

EXAMPLE II

A number of demonstrations were conducted to illustrate the high and low temperature behavior, the lifetest characteristics and longevity of the electrolytic capacitor and the electrolyte of the present invention. The demonsration results compiled in the following tables were obtained in an electrolyte system having the following composition: a solvent mixture of 90% by weight of γ-butyrolactone and 10% by weight of dimethyl formamide and an ionogen mixture consisting of 0.23 mole of tri-n-butylamine per kilogram of said solvent, 1.03 moles boric acid per kg. of said solvent, and 0.62 mole of water per kilogram of said solvent. In the following tables $C/U_N$ signifies the capacity C at the nominal voltage $U_N$, $I_R$ is the leakage current after five minutes at $U_N$ and $\Delta C$ is the change of capacity at the indicated temperature relative to the value of 25° C.

The conductivity of this electrolyte was 1.3 ms./cm. at 30° C. and 0.032 ms./cm. at −60° C., and the sparking potential was 440 volts. The following tabulation indicates the high and low temperature behavior of the electrolytic capacitor of the invention (each reading represents an average value of seven individual readings):

DEMONSTRATION I

| $C/U_N$ | Tg $f$ at 120 Hz (percent) | $I_R$ at 25° C. (μa.) | ΔC at −55° C. (percent) | ΔC at 125° C. (percent) | $I_R$ at $U_N$ and 125° C. (μa.) | Dimensions of housing (diameter mm. x lgth. mm.) |
|---|---|---|---|---|---|---|
| 10 μf./40 v | 5.4 | 0.019 | 15.2 | 6.6 | 0.15 | 8.5 x 20.0 |
| 10 μf./60 v | 5.3 | 0.021 | 17.0 | 6.0 | 0.21 | 8.5 x 25.5 |
| 2.5 μf./100 v | 6.6 | 0.039 | 21.1 | 17.1 | 1.08 | 8.5 x 20.0 |
| 2.0 μf./150 v | 4.9 | 0.043 | 17.3 | 13.5 | 0.65 | 8.5 x 25.5 |
| 1.0 μf./225 v | 5.0 | 0.040 | 13.1 | 11.8 | 0.57 | 8.5 x 25.5 |

The next tabulation indicates the life test characteristics of electrolytic capacitors constructed in accordance with the principles of the instant invention after 2,000 hours of operation at 125° C. at full rated voltage (each reading represents an average value of seven individual readings).

DEMONSTRATION II

| $C/U_N$ | $I_R$ (μa.) 0 hrs. | $I_R$ (μa.) 1,000 hrs. | $I_R$ (μa.) 2,000 hrs. | Tg $f$ (percent) 0 hrs. | Tg $f$ (percent) 1,000 hrs. | Tg $f$ (percent) 2,000 hrs. | ΔC (percent) 1,000 hrs. | ΔC (percent) 2,000 hrs. |
|---|---|---|---|---|---|---|---|---|
| 10 μf./40 v | 0.019 | 0.028 | 0.020 | 5.4 | 10.1 | 28.1 | <1.0 | −26.1 |
| 10 μf./60 v | 0.021 | 0.027 | 0.049 | 5.3 | 8.9 | 27.0 | −1.0 | −13.8 |
| 2.5 μf./100 v | 0.039 | 0.028 | 0.130 | 6.6 | 9.0 | 27.4 | −4.6 | −23.9 |
| 2.0 μf./150 v | 0.043 | 0.041 | 0.081 | 4.9 | 5.3 | 9.3 | <1.0 | −5.5 |
| 1.0 μf./225 v | 0.040 | 0.078 | 0.391 | 5.0 | 5.6 | 7.5 | <1.0 | −3.4 |

After the completion of the above 2,000 hour life test demonstration, the electrolytic test capacitors were stored for 100 hours without voltage at 125° C. These results are compiled in the next tabulation. The relatively poor behavior of types >100 v. $U_N$ is possibly due to the presence of the specially treated oxide layers in these test capacitors. An addition of phosphoric acid easily remedies this condition. As indicated hereinbefore, the following tabulation illustrates the behavior of these electrolytic test capacitors after 100 hours of storage without voltage potential at 125° C. These demonstrations were conducted after completion of the 2,000 hour life test at 125° C.

DEMONSTRATION III

| $C/U_N$ | $I_R$ (μa.) 0 hrs. | $I_R$ (μa.) 100 hrs. | ΔC. (percent)* |
|---|---|---|---|
| 10 μf./40 v | 0.020 | 0.058 | −2.8 |
| 10 μf./60 v | 0.049 | 0.037 | −2.7 |
| 2.5 μf./100 v | 0.130 | 0.246 | −6.6 |
| 2.0 μf./150 v | 0.081 | 0.978 | −2.9 |
| 1.0 μf./225 v | 0.391 | 15.1 | −1.8 |

*The decrease of capacity appears to be due to drying out of the electrolyte on account of leaky seals on the test capacitors.

Upon completion of the demonstrations set forth above (high and low temperature behavior, life test characteristics and storage without voltage) a single capacitor of each group was opened and observed for possible corrosion. There were no signs of corrosion in any of the capacitors observed.

The attached sheet of drawings illustrates, in graphic form, the temperature behavior of the capacity of the electrolytic capacitors provided with the hereinbefore indicated electrolytes.

The individual curves utilize the following values:

AS SHOWN ON THE DRAWING

| Curve | Capacity in μf. | Rated voltage in volts at 125° C. |
|---|---|---|
| 1 | 1 | 225 |
| 2 | 2 | 150 |
| 3 | 4 | 150 |
| 4 | 2.5 | 100 |
| 5 | 10 | 65 |
| 6 | 10 | 45 |

As will be appreciated, the excellent characteristics of the electrolyte and the electrolytic capacitor of the present invention, particularly the relatively high sparking potential, permits the manufacture of electrolytic capacitors with a rated voltage of up to 350 volts, and electrolytes with a sparking potential of at least 400 volts. Further, the electrolytes of the present invention exhibit no crystallization at temperatures above −60° C.

It will be understood that modifications and variations may be effected to the above described preferred embodiments of the invention, without departing from the spirit and scope of the novel concepts of the present invention.

We claim as our invention:

1. An electrolytic capacitor having an operating temperature range of −55° to +125° C. consisting essentially of an anode body of aluminum having a dielectrically effective aluminum oxide layer thereon, an electrolyte comprising a solvent mixture of 5 to 40% by weight of dimethyl formamide and 60 to 95% by weight of γ-butyrolactone and an ionogen mixture dissolved therein containing per kilogram of solvent mixture 0.1 to 2.0 moles of water, 0.10 to 0.25 mole of tri-n-butylamine and 0.3 to 1.2 moles of boric acid as a counter-electrode on said anode body and a cathode current supply means functionally connected with said electrolyte.

2. The electrolytic capacitor as defined in claim 1 wherein the mole ratio of boric acid to tri-n-butylamine in the ionogen mixture is in the range of 3.0:1 to 4.5:1.

3. The electrolytic capacitor as defined in claim 1 wherein the solvent mixture is 90% by weight of γ-butyrolactone and 10% by weight of dimethyl formamide.

4. The electrolytic capacitor as defined in claim 3 wherein the ionogen mixture per kilogram of solvent is 0.62 mole of water, 0.23 mole of tri-n-butylamine and 1.03 moles of boric acid.

5. The electrolytic capacitor as defined in claim 1 wherein the electrolyte includes per kilogram of solvent mixture 0.005 to 0.01 mole phosphorus in the form of a phosphate ion forming compound.

6. The electrolytic capacitor as defined in claim 5 wherein the phosphate ion forming compound is phosphoric acid.

7. An electrolyte for an electrolytic capacitor having an operating temperature range of −55° to +125° C. consisting essentially of a solvent mixture of 95 to 60% by weight of γ-butyrolactone and 40 to 5% by weight of dimethyl formamide, and ionogen means dissolved therein providing a sparking potential of at least 400 volts.

8. An electrolyte for an electrolytic capacitor having an operating temperature range of −55° to +125° C. consisting essentially of a solvent mixture of 95 to 65% by weight of γ-butyrolactone and 40 to 5% by weight of dimethyl formamide, and an ionogen mixture dissolved therein containing per kilogram of said solvent mixture 0.1 to 2 moles of water, 0.10 to 0.25 mole of tri-n-butylamine and 0.3 to 1.2 moles of boric acid.

9. The electrolyte as defined in claim 8 wherein the mole ratio of boric acid to tri-n-butylamine is in the range of 3.0:1 to 4.5:1.

10. The electrolyte as defined in claim 8 wherein the solvent mixture is 90% by weight of γ-butyrolactone and 10% by weight of dimethyl formamide.

11. The electrolyte as defined in claim 8 wherein the ionogen mixture per kilogram of solvent is 0.62 mole of water, 0.23 mole of tri-n-butylamine and 1.03 moles of boric acid.

12. The electrolyte as defined in claim 8 wherein 0.005 to 0.01 mole of phosphorus in the form of a phosphate ion forming compound are added per kilogram of solvent mixture.

13. The electrolyte as defined in claim 8 wherein the solvent mixture is about 90% by weight of γ-butyrolactone and about 10% by weight of dimethyl formamide and the ionogen mixture per kilogram of solvent is about 0.62 mole of water, about 0.23 mole of tri-n-butylamine and about 1.03 moles of boric acid.

14. The electrolyte as defined in claim 13 wherein 0.005 to 0.01 mole of phosphoric acid are added per kilogram of solvent mixture.

15. An electrolyte for an electrolytic capacitor having a rated voltage of up to about 350 volts and an operating temperature range of −55° to +125° C. consisting essentially of a solvent mixture of about 95% to 60% by weight of γ-butyrolactone and about 40% to 5% by weight of dimethyl formamide, an ionogen mixture dissolved therein containing per kilogram of said solvent mixture about up to 2 moles of water, about 0.10 to 0.25 mole of tri-n-butylamine and about 0.3 to 1.125 moles of boric acid and an anti-dehydration agent comprising about 0.005 to 0.01 mole of phosphoric acid per kilogram of said solvent mixture.

References Cited

UNITED STATES PATENTS

| | | | |
|---|---|---|---|
| 2,965,690 | 12/1960 | Petersen et al. | 317—230 |
| 2,994,809 | 8/1961 | Jenny et al. | 317—230 |
| 3,136,780 | 6/1964 | Kalyer et al. | 260—326.5 |
| 3,138,746 | 6/1964 | Burger et al. | 317—230 |
| 3,302,071 | 1/1967 | Stahr | 317—230 |
| 3,351,823 | 11/1967 | Jenny | 317—230 |

JAMES D. KALLAM, Primary Examiner

U.S. Cl. X.R.

252—62.2

UNITED STATES PATENT OFFICE
CERTIFICATE OF CORRECTION

Patent No. 3,510,731                                May 5, 1970

Sigrid Thiem et al.

It is certified that error appears in the above identified patent and that said Letters Patent are hereby corrected as shown below:

Column 3, line 44, "contuctivity" should read -- conductivity --. Column 6, line 10, "6.0" should read -- 6.9 --; line 68, "5" should read -- 50 --.

Signed and sealed this 6th day of October 1970.

(SEAL)
Attest:

Edward M. Fletcher, Jr.
Attesting Officer

WILLIAM E. SCHUYLER, JR.
Commissioner of Patents